(12) United States Patent
Delgado

(10) Patent No.: US 7,253,373 B2
(45) Date of Patent: Aug. 7, 2007

(54) AIR-COOLED ARC WELDING IMPLEMENT

(75) Inventor: David Delgado, Rancho Cucamonga, CA (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/626,269

(22) Filed: Jul. 24, 2003

(65) Prior Publication Data

US 2005/0016966 A1   Jan. 27, 2005

(51) Int. Cl.
*B23K 9/16* (2006.01)
(52) U.S. Cl. .......................... 219/75; 219/136
(58) Field of Classification Search ................. 219/75, 219/136, 137.62
See application file for complete search history.

(56) References Cited

U.S. PATENT DOCUMENTS

| | | | | |
|---|---|---|---|---|
| 2,659,796 | A | * 11/1953 | Anderson | 219/137.9 |
| 3,296,407 | A | * 1/1967 | Wallace | 219/75 |
| 4,049,943 | A | * 9/1977 | Pratt | 219/74 |
| 4,145,595 | A | * 3/1979 | Keller et al. | 219/75 |
| 4,354,088 | A | 10/1982 | Rehrig | 219/75 |
| 4,361,747 | A | 11/1982 | Torrani | 219/75 |
| 4,590,354 | A | 5/1986 | Marhic et al. | |
| 4,682,005 | A | 7/1987 | Marhic | |
| 4,769,521 | A | 9/1988 | Sugiyama | 219/75 |
| 5,258,599 | A | 11/1993 | Moerke | 219/121.48 |
| 5,338,917 | A | 8/1994 | Stuart et al. | 219/137.63 |
| 5,714,729 | A | 2/1998 | Yamada et al. | 219/75 |
| 5,772,102 | A | * 6/1998 | New et al. | 228/42 |
| 5,841,105 | A | 11/1998 | Haczynski et al. | 219/137.31 |
| 5,866,874 | A | 2/1999 | Haczynski et al. | 219/137.31 |
| 6,399,913 | B1 | 6/2002 | Sammons et al. | 219/75 |

* cited by examiner

*Primary Examiner*—Len Tran
(74) *Attorney, Agent, or Firm*—Fletcher Yoder

(57) ABSTRACT

A welding implement, such as a TIG welding torch. The welding implement comprises a torch head and a thermal storage member. The torch head is operable to conduct electricity to a welding electrode disposed therein. The thermal storage member is adapted to store heat from the torch head during operation of the torch and to release the heat when the torch is not operated. The thermal storage member is electrically isolated from the torch head by an electrical insulator. The welding implement may comprise a tube coupled to the torch head to conduct gas and electricity to the torch head. The welding implement may also comprise a second tube disposed around the tube proximate to the torch head to increase heat transfer from the torch head to the tube.

38 Claims, 3 Drawing Sheets

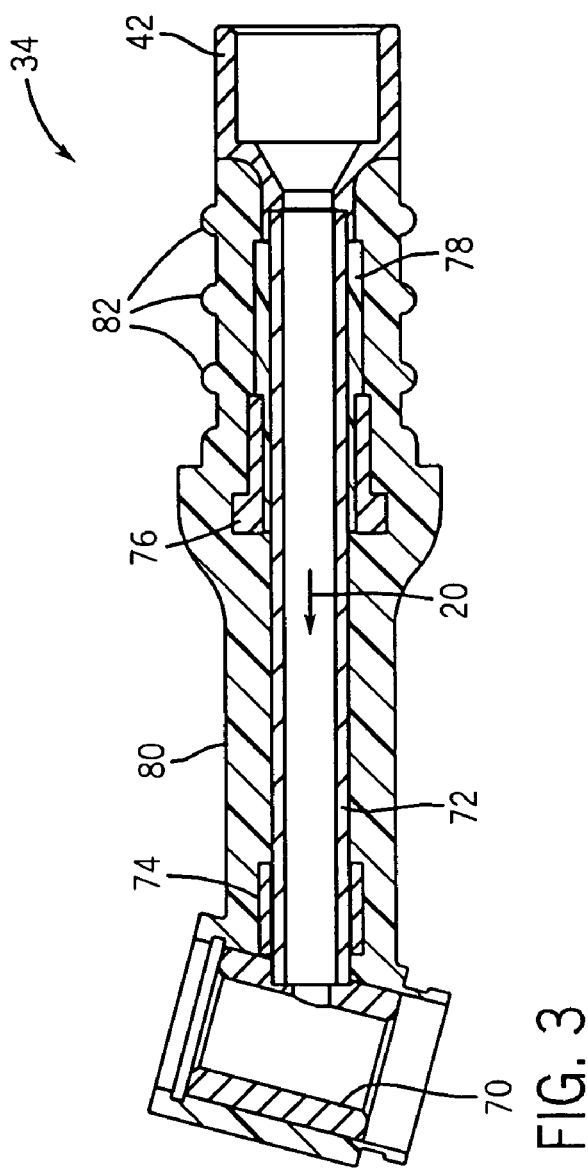
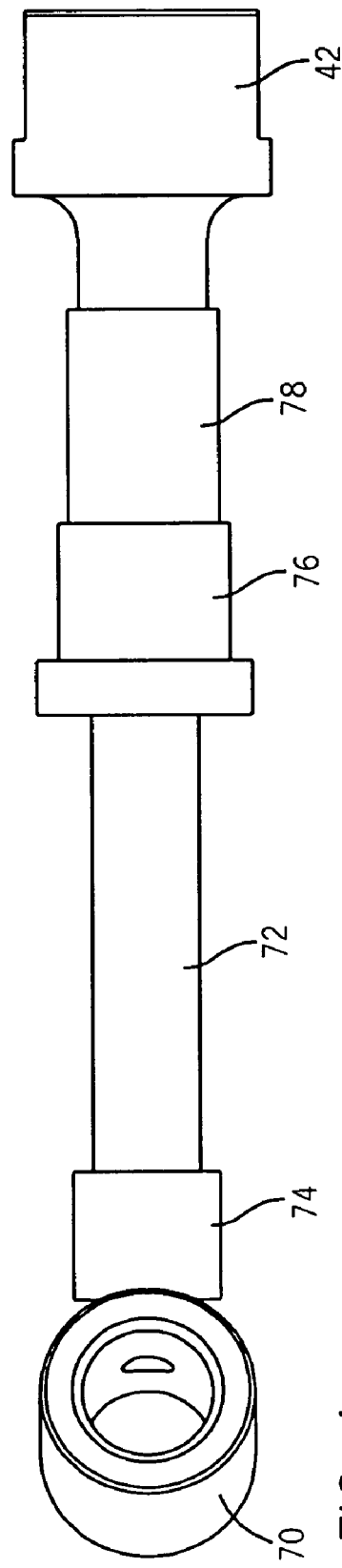

AIR-COOLED ARC WELDING IMPLEMENT

BACKGROUND OF THE INVENTION

The present invention relates generally to the field of arc welding, and more particularly to the field of air-cooled arc welding torches.

Arc welding is a welding process in which an electric current is used to produce localized melting in a work piece. There are many different types of arc welding processes. One example of an arc welding process is TIG (Tungsten Inert Gas) welding (also known as gas tungsten arc welding, GTAW, or HELIARC). TIG welding is a type of arc welding process in which an electric arc is maintained between a welding implement, such as a hand-held welding torch, and a metal work piece. Typically, the welding implement includes a cylindrical electrode coupled to a torch head. The arc is produced by electricity that flows between the electrode and the work piece. Typically, the electrode is comprised of tungsten. The electricity for the arc welding process is provided by a power source coupled to the torch head of the welding implement by a power cable.

The electricity flowing through the torch head may produce a substantial amount of heat. In addition, the electricity flowing through the electrode and the work piece may produce heat that is transferred to the torch head. The heat introduced into the torch head may damage the components of the torch. In addition, the heat may make the torch difficult to hold. The amount of heat produced is a function of the current flowing through the torch. The torches may be air-cooled at low current levels. However, the ability of air-cooling to sufficiently cool the torch decreases as the amount of current flowing through the torch increases. Consequently, the amount of current at which the torch is operated may be limited by the temperature increase in the torch caused by the current flowing through the torch. Therefore, liquid-cooled welding torches have been developed to remove a greater amount of the heat from within the torch head, thereby enabling the torch to be operated at higher current levels. However, liquid cooling the torch increases the cost and complexity of the torch and the welding system used to operate the torch. For example, a liquid-cooled torch requires a liquid-cooling unit to produce a flow of cooling liquid and to remove the heat from the liquid.

Therefore, a need exists for a technique to increase the ability of an air-cooled TIG welding torch to remove heat. More specifically, a need exists for a technique to enable an air-cooled welding torch to remove a greater amount of heat so that the torch may be operated at greater current levels.

BRIEF DESCRIPTION OF THE DRAWINGS

The foregoing and other advantages and features of the invention will become apparent upon reading the following detailed description and upon reference to the drawings in which:

FIG. 3 is a cross-sectional view of the torch of FIG. 2; and

FIG. 4 is an elevational view of the internal portions of the torch of FIG. 2.

DETAILED DESCRIPTION OF SPECIFIC EMBODIMENTS

Figure 1:
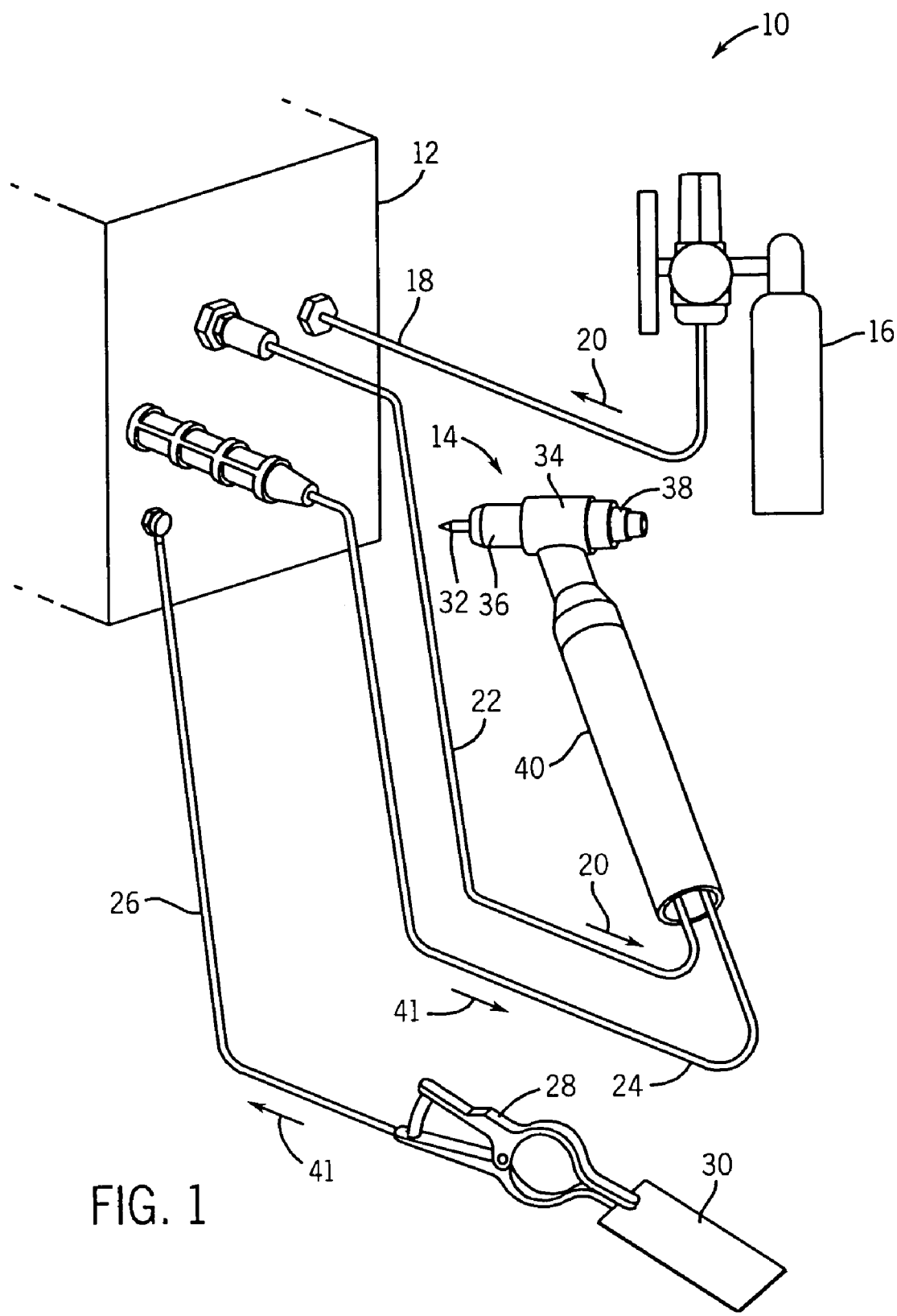
FIG. 1 is an elevational view of a TIG welding system, in accordance with an exemplary embodiment of the present invention.

Referring generally to FIG. 1, a welding system 10 is illustrated. The TIG welding system 10 comprises a welding power supply 12 and a welding torch assembly 14. The power supply 12 may be a constant current AC, DC, a combination AC/DC source, or some other type of power supply. In the illustrated embodiment, the system 10 also comprises a gas cylinder 16 that is coupled by a hose 18 to the welding power supply 12. The gas cylinder 16 supplies gas 20 to the welding power supply 12, which in turn supplies the gas 20 to the welding torch assembly 14 via a second gas hose 22. A power cable 24 is also coupled from the welding power supply 12 to the welding torch assembly 14. The system 10 also comprises a return cable 26 and clamp 28 to electrically couple a work piece 30 to the power supply 12.

The welding torch assembly 14 is adapted to couple electricity from the power supply 12 to the work piece 30 and to direct a flow of gas toward the point of contact with the work piece 30. The welding torch assembly 14 is adapted to receive an electrode 32. The welding torch assembly 14 has a torch 34 that is adapted to hold the electrode 32. The welding torch assembly 14 also comprises a nozzle 36 to produce a conical flow of gas 20 directed towards the work piece 30 and a back cap 38 to seal the opposite end of the torch 34 and to receive the electrode 32. A handle 40 is coupled to the torch 34 to enable a user to direct movement of the welding torch assembly 14. When the electrode 32 comes into close proximity to the work piece 30, an arc is produced between the electrode 32 and the work piece 30, completing an electric circuit between the power supply 12 and the work piece 30. An electric current 41 flows from the power supply 12 through the welding torch assembly 14 to the electrode 32, work piece 30, and back to the power supply 12. The electric current 41 flowing through the work piece 30 causes localized melting. The gas 20 forms a shield around the weld puddle.

Figure 2:
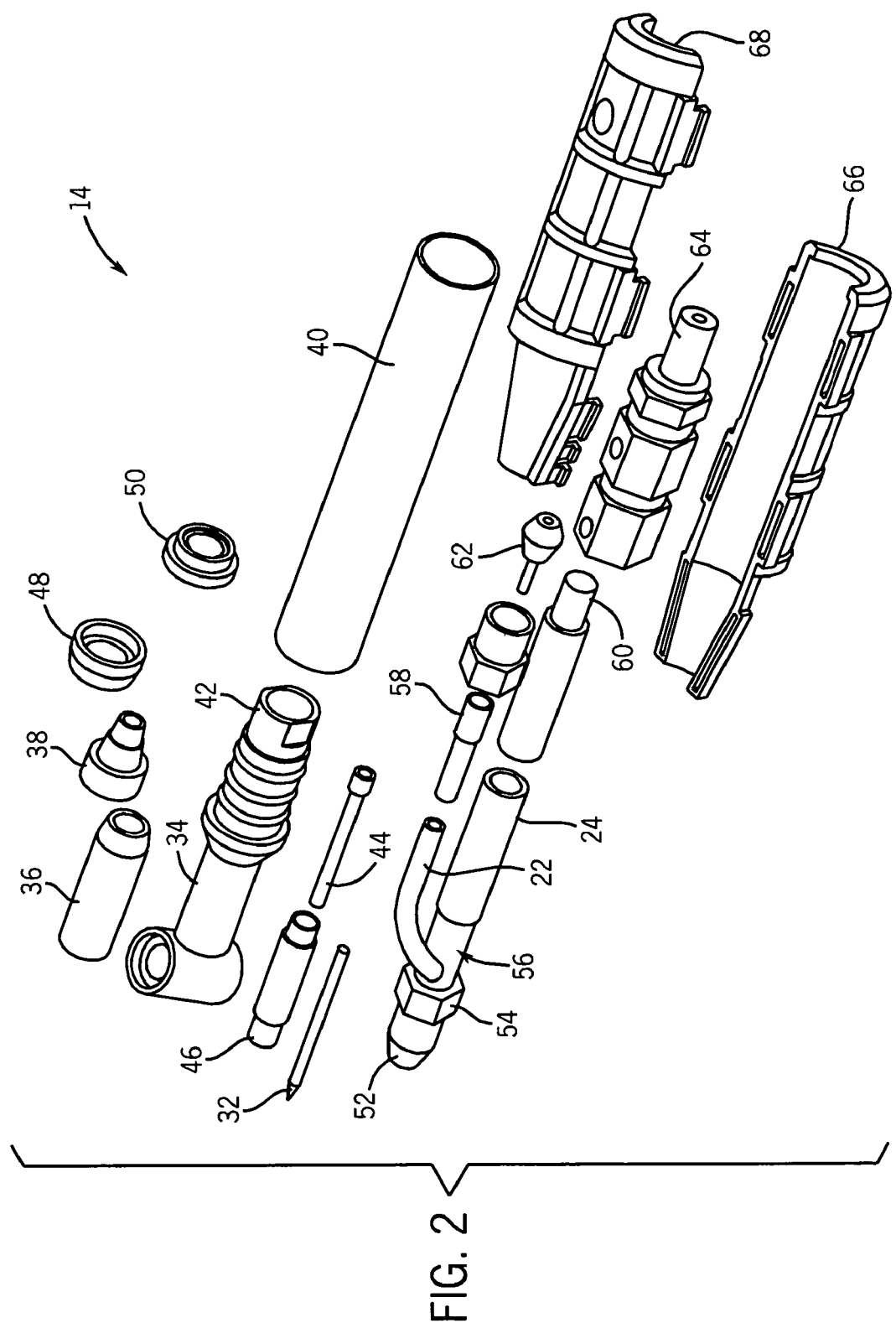
FIG. 2 is an exploded view of the TIG welding torch assembly of FIG. 1.

Referring generally to FIG. 2, the welding torch assembly 14 comprises a plurality of components. In the illustrated embodiment, the torch assembly 14 comprises a collet 44 and a collet body 46 used to secure the electrode 32 to the torch 34. The collet body 46 receives the electrode 32 therethrough. The collet 44 and collet body 46 are urged together by threading the back cap 38 into the torch 34, causing the collet body 46 to compress against the electrode 32. In addition, an insert 48 and a cup gasket 50 also are secured to the torch 34.

The gas hose 22 and the power cable 24 are connected to the connector 42 of the torch 34 by a nipple 52, a nut 54, and a current nipple 56. The gas hose 22 and the power cable 24 are connected to the current nipple 56. The nut 54 secures the current nipple 56 to the connector 42. Gas 20 and electricity 41 flow from the current nipple 56 through the nipple 52 to the torch 34. The gas hose 22 is secured to the power supply 12 by a ferrule 58, a nut 60, and a nipple 62. The power cable 24 is connected to the power supply 12 by a fitting 64 housed within a first insulating boot 66 and a second insulating boot 68. In the present embodiment, the power cable 24, nipple 52, current nipple 56, and fitting 64 are air-cooled and adapted to conduct 300 Amps to the torch 34.

Referring generally to FIG. 3, the torch 34 comprises a torch head 70 that is coupled by a speed channel 72 to the connector 42. The speed channel 72 is a tube comprised of a conductive metal to enable electricity to flow from the connector 42 to the torch head 70. Preferably, the torch head 70 and speed channel 72 are comprised of copper. Electricity flowing through the torch head 70 and the speed channel 72 produces heat. In the illustrated embodiment, some of the heat within the torch 34 is transferred to the air. In addition, some heat is transferred by conduction from the torch head 70 through the speed channel 72 and connector 42 to the power cable 22. The heat in the power cable 22 is subsequently transferred by convection to the air. In addition, some of the heat within the torch 34 is transferred by convection to the gas 20 flowing through the torch head 70 and speed channel 72. In the illustrated embodiment, a heat dam 74 is provided to absorb additional heat from the torch head 70 and couple the heat to the speed channel 72. Preferably, the heat dam 74 comprises a copper tube disposed around the speed channel 72.

Torch 34 also comprises a thermal storage member 76 that is adapted to take advantage of the duty cycle of the system 10 to cool the torch 34. The thermal storage member 76 is adapted to cool the torch head 70 during operation of the torch 34 by storing heat transferred from the torch head 70 via the speed channel 72. The thermal storage member 76 then releases the heat to the speed channel 72 when power to the torch head 70 is removed. The heat is transferred from the speed channel 72 to the air via the power cable 24 and the torch head 70.

Those skilled in the art will recognize that a number of factors are relevant to the design of the thermal storage member 76. For example, the specific heat capacity (c) of the thermal storage member 76 and the mass (m) of the thermal storage member 76 are relevant in defining the heat storage characteristics of the thermal storage member 76. For a given material, the larger the mass of the material, the greater the amount of heat that can be stored within the material. However, the torch will be heavier with a greater mass of material. In addition, the thermal conductivity (k) of the thermal storage member 76 is relevant in defining how quickly heat will be conducted to and from the thermal storage member 76. Therefore, all of these factors, and others, may be balanced when selecting the size and composition of the thermal storage member 76. In the illustrated embodiment, the thermal storage member 76 comprises aluminum.

An insulator 78 is disposed between the thermal storage member 76 and the speed channel 72 to electrically isolate the thermal storage member 76 from the speed channel 72. Thus, no electrical current flows through the thermal storage member 76 to generate heat. In addition, the insulator 78 positions the thermal storage member 76 axially along the speed channel 72. Preferably, the insulator 78 comprises teflon.

In the illustrated embodiment, the torch 34 is covered by an insulating material 80. Preferably, the insulating material is silicone rubber. In addition, the insulating covering 80 comprises a plurality of ridges 82. The ridges 82 are adapted to produce friction to secure the handle 40 to the torch 34 when the handle 40 is disposed over the torch 34.

In accordance with European (CE) welding temperature standards, the current rating of a welding torch is defined by the temperature increase at the handle and cable at the rated current with the torch operating at a 60% duty cycle (i.e., subjected to a current flow 60% of a standard unit of time). The increase in temperature must be less than 30 K at the handle and less that 40 K at the cable for a welding torch to be rated at a given current rating. A prototype of the welding torch described above was tested with the power supply supplying 300 Amps at a 60% duty cycle. The top of the handle was measured to increase by 27° F. on the top of the handle and to increase by 21.5° F. on the bottom of the handle. This corresponds to an increase in temperature in Kelvin of approximately 15.2 K and 12.2 K, respectively.

The above-described embodiment of an air-cooled welding torch provides a technique for increasing the ability of an air-cooled welding torch to remove heat. In addition, the above-described embodiment of an air-cooled welding torch is operable to provide sufficient cooling to enable the torch to conduct a 300 Amp current within temperature limits.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A welding implement, comprising:
   a torch head configured to conduct electricity to a welding electrode disposed therein; and
   a thermal storage member adapted to absorb heat from the torch head;
   a first electrical insulator disposed along an interior of the thermal storage member; and
   a second electrical insulator disposed completely around an exterior of the thermal storage member.

2. The welding implement as recited in claim 1, wherein the thermal storage member comprises metal.

3. The welding implement as recited in claim 1, wherein the thermal storage member comprises aluminum.

4. The welding implement as recited in claim 1, comprising an electrically conductive tube operable to conduct electricity and gas to the torch head and heat from the torch head to the thermal storage member, wherein the thermal storage member is disposed around at least a portion of the tube.

5. The welding implement as recited in claim 4, wherein the first electrical insulator is disposed between the electrically conductive tube and the thermal storage member, wherein heat is conducted from the electrically conductive tube to the thermal storage member through the first electrical insulator.

6. The welding implement as recited in claim 5, wherein the first electrical insulator is adapted to position the thermal storage member axially along the tube.

7. The welding implement as recited in claim 4, wherein the electrically conductive tube comprises a first conductive metal and the thermal storage member comprises a second conductive metal.

8. The welding implement as recited in claim 1, wherein the torch head is air-cooled and operable to conduct 300 Amps at a 60% duty cycle with a temperature increase of less than 30 K.

9. The welding implement as recited in claim 4, comprising a second tube disposed around a portion of the electrically conductive tube located proximate to the torch head.

10. The welding implement as recited in claim 1, wherein the thermal storage member is configured to cool the torch head in response to a duty cycle of the welding implement by absorbing heat from the torch head while the torch head is conducting electricity and subsequently returning heat to the welding implement while the torch head is not conducting electricity during operation of the welding implement.

11. The welding implement as recited in claim 10, wherein the welding implement is adapted to dissipate heat returned from the thermal storage member.

12. A welding implement, comprising:
a tube operable to conduct electricity to a torch head and to conduct heat from the torch head;
a metal member disposed in a thermally conductive relationship with the tube, wherein the metal member is configured to absorb heat from the torch head;
an electrical insulator disposed between the tube and the metal member; and
an insulating material disposed entirely over the tube and metal member.

13. The welding implement as recited in claim 12, wherein the metal member is disposed around at least a portion of the tube.

14. The welding implement as recited in claim 12, wherein the electrical insulator is adapted to limit axial movement of the metal member relative to the tube.

15. The welding implement as recited in claim 12, comprising a first connector coupled to the tube and coupleable to a second connector coupled to a gas hose and a power cable.

16. The welding implement as recited in claim 12, comprising the torch head.

17. The welding implement as recited in claim 12, wherein the insulating material includes a plurality of ridges adapted to produce friction with a handle disposed over the plurality of ridges.

18. The welding implement as recited in claim 12, wherein the metal member is configured to cool the welding implement in response to a duty cycle of the welding implement by absorbing heat from the tube while the tube is conducting electricity and subsequently returning heat to the tube while the tube is not conducting electricity during operation of the welding implement.

19. A welding implement, comprising:
a torch head;
a first tubular member having a passage therethrough to couple gas to the torch head;
a second tubular member disposed over the first tubular member, wherein the second tubular member is configured to absorb heat from the first tubular member;
a third tubular member disposed between the first and second tubular members, wherein the third tubular member comprises an electrical insulator; and
an insulating material disposed about an exterior of the third tubular member.

20. The welding implement as recited in claim 19, wherein the first and second tubular members comprise copper.

21. The welding implement as recited in claim 19, wherein the second tubular member is configured to cool the torch head in response to a duty cycle of the welding implement by absorbing heat from the torch head while the torch head is conducting electricity and subsequently returning heat to the welding implement while the torch head is not conducting electricity during operation of the welding implement.

22. A TIG welding system, comprising:
a power source; and
an air-cooled TIG welding torch electrically coupleable to the power source, comprising:
a torch head adapted to conduct electricity to an electrode disposed therein;
a thermal storage member electrically isolated from the torch head;
a first electrical insulator disposed over the torch head and concentrically about the thermal storage member; and
a second electrical insulator disposed concentrically inside the thermal storage member.

23. The TIG welding system as recited in claim 22, comprising a conductive tube adapted to couple electricity and gas to the torch head, wherein the second electrical insulator is disposed between the conductive tube and the thermal storage member.

24. The TIG welding system as recited in claim 22, wherein the air-cooled TIG welding torch is operable to conduct 300 Amps at a 60% duty cycle with a temperature increase of less than 30 K.

25. The TIG welding system as recited in claim 22, wherein the air-cooled TIG welding torch is operable to conduct 300 Amps at a 60% duty cycle with a temperature increase of less than or equal to 27° F.

26. The TIG welding system as recited in claim 22, wherein the thermal storage member is configured to cool the torch head in response to a duty cycle of the air-cooled TIG welding torch by absorbing heat from the torch head while the torch head is conducting electricity and subsequently returning heat to the air-cooled TIG welding torch while the torch head is not conducting electricity during operation of the air-cooled TIG welding torch.

27. A welding implement, comprising:
a torch head including a collet assembly configured to support an electrode;
a conductor extending from the torch head and operable to electrically couple the torch head to a power source to route electrical current to the electrode;
a metallic member disposed about the conductor and electrically isolated from the conductor and the torch head, wherein the metallic member is configured to absorb heat from the conductor;
a first dielectric material disposed between the metallic member and conductor; and
a second dielectric material disposed about the torch head, the metallic member, and the conductor, wherein the second dielectric material extends along the entire length of the metallic member.

28. The welding implement as recited in claim 27, wherein the torch head is air-cooled and operable to conduct 300 Amps at a 60% duty cycle with a temperature increase of less than 30K.

29. The welding implement as recited in claim 27, wherein the metallic member is configured to cool the torch head in response to a duty cycle of the welding implement by absorbing heat from the conductor while the conductor is conducting electricity and subsequently returning heat to the conductor while the conductor is not conducting electricity during operation of the welding implement.

30. The welding implement as recited in claim 29, wherein the conductor is adapted to dissipate heat returned from the metallic member when the conductor is not conducting electricity.

31. A welding implement, comprising:
a torch head;
a conductor extending from the torch head, wherein the conductor is configured to enable passage of a gas;
a thermal storage member disposed proximate the conductor and configured to absorb heat from the conductor; and
a protective cover substantially enveloping the thermal storage member, wherein the protective cover comprises a first electrical insulator; and a second electrical insulator disposed between the thermal storage member and the conductor.

32. The welding implement as recited in claim 31, wherein the thermal storage member is configured to cool the torch head in response to a duty cycle of the welding implement by absorbing heat from the conductor while the conductor is conducting electricity and subsequently returning heat to the conductor while the conductor is not conducting electricity during operation of the welding implement.

33. A welding implement, comprising:
a torch head configured to conduct electricity according to a duty cycle; and
a thermal storage member configured to take advantage of the duty cycle to cool the torch head during operation of the welding implement, wherein the thermal storage member is configured to store heat transferred from the torch head to the thermal storage member during an on state of the duty cycle, and the thermal storage member is configured to release heat stored during the on state back to the welding implement for heat dissipation during an off state of the duty cycle; and
an electrical insulator that electrically isolates the thermal storage member from the torch head.

34. The welding implement as recited in claim 33, comprising an insulating material disposed completely about an outer perimeter of the thermal storage member.

35. The welding implement as recited in claim 33, comprising a first tubular structure comprising the electrical insulator, a second tubular structure comprising the thermal storage member disposed concentrically about the first tubular structure, and an insulating material disposed completely about the second tubular structure.

36. The welding implement as recited in claim 35, comprising a third tubular structure disposed concentrically inside the first tubular structure, wherein the third tubular structure is configured to conduct electricity according to the duty cycle and to pass a gas to the torch head.

37. A welding implement, comprising:
a torch head configured to conduct electricity to a welding electrode according to a duty cycle;
a conductor leading to the torch head, wherein the conductor is configured to conduct electricity to the torch head according to the duty cycle;
a heat dam disposed adjacent the torch head, wherein the heat dam is configured to absorb heat from the torch head and to transfer the heat to the conductor; and
a thermal storage member disposed adjacent the conductor, wherein the thermal storage member is configured to take advantage of the duty cycle to cool the torch head during operation of the welding implement, the thermal storage member is configured to store heat transferred from the torch head to the thermal storage member via the conductor during an on state of the duty cycle, and the thermal storage member is configured to release heat stored during the on state back to the conductor for heat dissipation during an off state of the duty cycle; and
an insulating material disposed completely about an outer perimeter of the heat dam and the thermal storage member.

38. The welding implement as recited in claim 37, comprising an electrical insulator that electrically isolates the thermal storage member from the torch head and the conductor.

* * * * *